US011745283B2

(12) United States Patent
Hoeger

(10) Patent No.: US 11,745,283 B2
(45) Date of Patent: Sep. 5, 2023

(54) METHODS FOR WIRE SURFACE OXIDATION REMOVAL AND/OR WIRE PREHEATING USING POLYPHASE ELECTRIC ARC PREHEATING

(71) Applicant: ILLINOIS TOOL WORKS INC., Glenview, IL (US)

(72) Inventor: Michael V. Hoeger, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 372 days.

(21) Appl. No.: 16/936,070

(22) Filed: Jul. 22, 2020

(65) Prior Publication Data

US 2021/0060684 A1 Mar. 4, 2021

Related U.S. Application Data

(60) Provisional application No. 62/892,116, filed on Aug. 27, 2019.

(51) Int. Cl.
*B23K 9/10* (2006.01)
*B23K 9/173* (2006.01)
*B23K 9/167* (2006.01)

(52) U.S. Cl.
CPC ............ *B23K 9/1093* (2013.01); *B23K 9/173* (2013.01); *B23K 9/1675* (2013.01)

(58) Field of Classification Search
CPC ...... B23K 9/164; B23K 9/1075; B23K 9/133; B23K 9/1093; B23K 9/1735; B23K 9/10; B23K 9/121; B23K 9/1675; B23K 9/173
See application file for complete search history.

(56) References Cited

U.S. PATENT DOCUMENTS

| | | | |
|---|---|---|---|
| 2012/0183266 A1* | 7/2012 | Wiley | G02B 6/2551 385/96 |
| 2014/0008354 A1 | 1/2014 | Pletcher | |
| 2015/0209889 A1 | 7/2015 | Peters | |
| 2017/0165778 A1 | 6/2017 | Hsu | |
| 2018/0099346 A1 | 4/2018 | Zwayer | |
| 2018/0354056 A1 | 12/2018 | Sigl | |

FOREIGN PATENT DOCUMENTS

| | | |
|---|---|---|
| CN | 1686656 | 10/2005 |
| CN | 102000903 | 4/2011 |
| CN | 102528243 | 7/2012 |
| CN | 108581156 | * 9/2018 |
| EP | 2666041 | 11/2013 |

(Continued)

OTHER PUBLICATIONS

Machine Translation of Han et al, CN 108581156 performed on Oct. 7, 2022 (Year: 2018).*

(Continued)

*Primary Examiner* — Brian W Jennison
(74) *Attorney, Agent, or Firm* — McAndrews, Held & Malloy, Ltd.

(57) ABSTRACT

An apparatus and system for preheating and removing surface oxidation of welding wire using electric arcs one via three or more tungsten electrodes connected to a polyphaser preheating power source is disclosed. Electric arc preheating of welding wire allows increased efficiency and deposition rates.

19 Claims, 8 Drawing Sheets

(56) References Cited

FOREIGN PATENT DOCUMENTS

EP          3265263 A1      1/2018
JP          S62207583 A     9/1987

OTHER PUBLICATIONS

European Office Communication Appln No. 20192102.0 dated Feb. 11, 2022.
Ni, Jun, Influence of Preheated Wire on GMAW Process, Advanced Materials Research, ISSN: 1662-8985, vol. 668, pp. 538-542, doi: 10.4028/www.scientific.net/AMR.668.538, Trans Tech Publications, Switzerland, Online: Mar. 11, 2013 (5 pages).
Ni, Jun, Effect of the Wire Temperature on the Weld Fomation in GMAW, Advanced Materials Research, ISSN: 1662-8985, vols. 652-654, pp. 2289-2292, doi: 10.4028/www.scientific.net/AMR.652-654.2289, Trans Tech Publications, Switzerland, Online: Jan. 25, 2013 (4 pages).
PCT, Notification of Transmittal of the International Search Report and the Written Opinion of the International Searching Authority, or the Declaration, in International Application No. PCT/US2019/049112, dated Nov. 21, 2019 (10 pages).
European Patent Office, Communication with extended European search report in Application No. 20192102.0, dated Mar. 4, 2021 (11 pages).
European Office Communication Appln No. 20192102.0 dated Nov. 10, 2022.

* cited by examiner

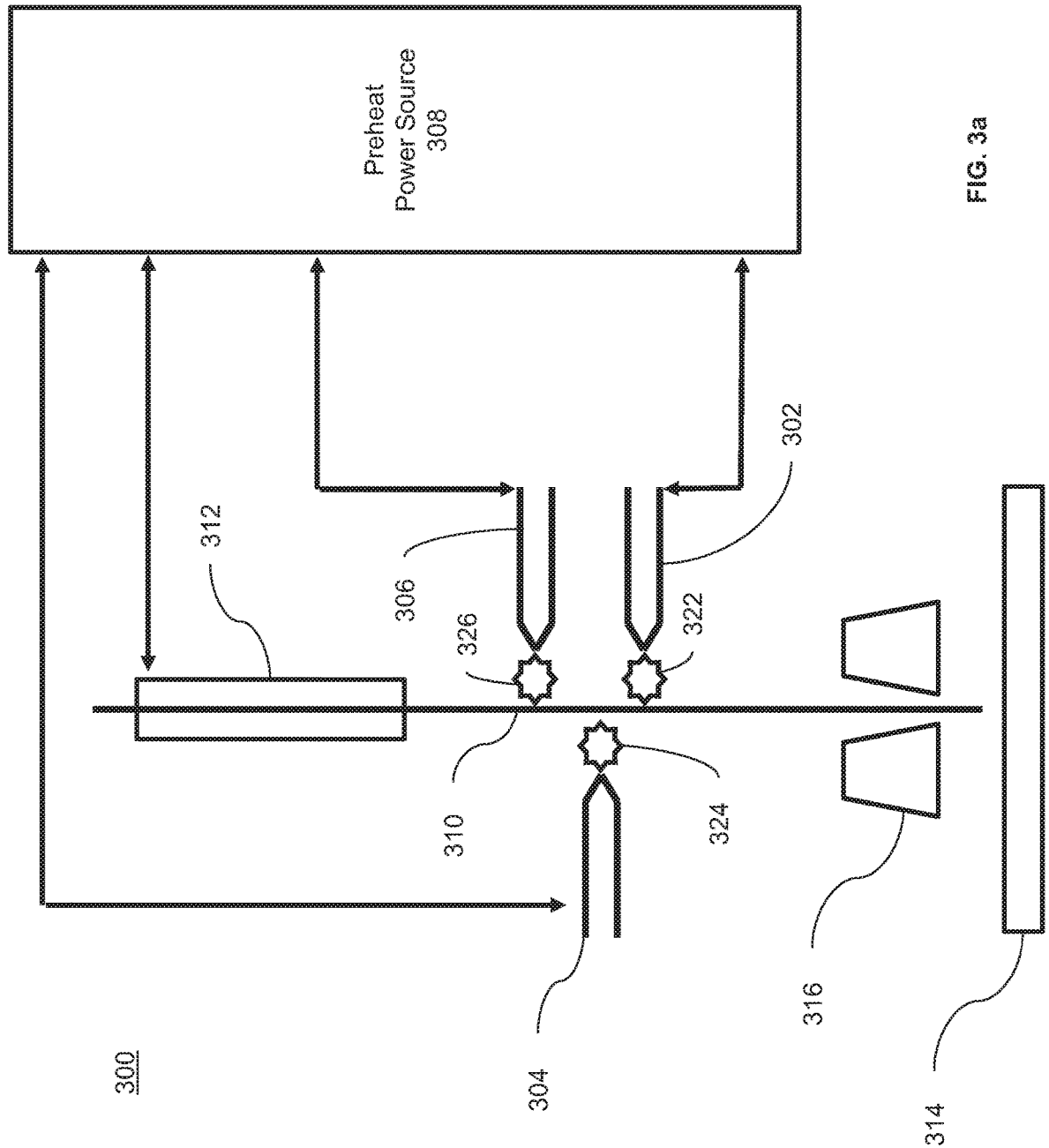

METHODS FOR WIRE SURFACE OXIDATION REMOVAL AND/OR WIRE PREHEATING USING POLYPHASE ELECTRIC ARC PREHEATING

CROSS REFERENCE TO RELATED APPLICATIONS

The present application claims the benefit of U.S. Provisional Patent Application Ser. No. 62/892,116 filed Aug. 27, 2019, entitled "Systems and Methods for Wire Surface Oxidation Removal And/Or Wire Preheating Using Polyphase Electric Arc Preheating." The entire contents of U.S. Provisional Patent Application Ser. No. 62/892,116 are expressly incorporated herein by reference.

BACKGROUND

The present disclosure relates to welding systems and, more particularly, to systems and methods for wire surface oxidation removal and/or wire preheating using a tungsten arc.

Welding is a process that has increasingly become ubiquitous in all industries. A wide range of welding systems and welding control regimes have been implemented for various purposes. In continuous welding operations, gas metal arc welding (GMAW) and submerged arc welding (SAW) techniques allow for formation of a continuing weld bead by feeding welding wire shielded by inert gas from a welding torch. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

SUMMARY

The present disclosure relates to welding systems and, more particularly, to systems and methods for wire surface oxidation removal and/or wire preheating using electric arcs, substantially as illustrated by and described in connection with at least one of the figures, as set forth more completely in the claims.

BRIEF DESCRIPTION OF THE DRAWINGS

FIG. 3a is a block diagram of an example electric arc preheating system illustrating a current path of the example electric arc preheating system.

FIG. 3b is an example time plot of the voltages of the phases of three-phase power that may be applied to the electric arc preheating system of FIG. 3a.

The figures are not necessarily to scale. Where appropriate, similar or identical reference numbers are used to refer to similar or identical components.

DETAILED DESCRIPTION

Figure 1A:
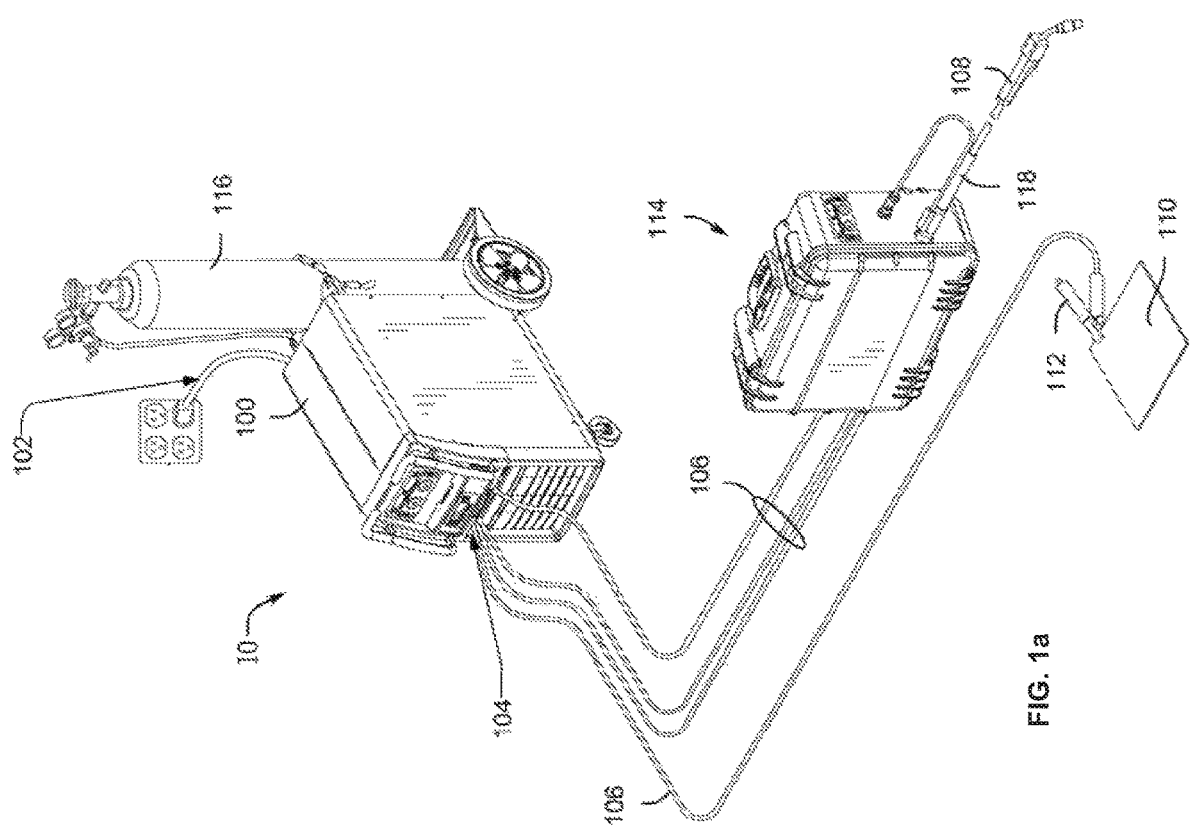
FIG. 1a is an illustration of an example welding-type system in accordance with aspects of this disclosure.

In some welding applications, it is desirable to preheat the welding wire before the welding wire is deposited onto a workpiece. Preheating the welding wire can result in one or more advantages, such as reducing the heat to be applied to the workpiece via the welding arc, increasing deposition rates, and/or reducing hydrogen present in the weldment. For example, in systems in which welding wire is not preheated, the power from the welding arc must be sufficient to both melt the base material and the ambient temperature welding wire. Systems in which welding wire is not preheated therefore may suffer from a low deposition rate and/or a low thermal efficiency. This low deposition rate and efficiency is due, in part, by the low energy transfer efficiency between the welding arc and the desired heated materials (i.e., a workpiece).

Additionally, in systems in which the welding wire is a filler material, excess energy is transferred to the workpiece, so that the weld pool has sufficient energy to melt the incoming filler. This excess energy is readily extracted from the desired location of heat application due to the high thermal diffusivity nature of metals. Addition of excess energy is undesirable, as the increased temperature can produce distortion, alter the metallurgical properties of the workpiece, increase atmospheric oxidation, and/or reduce efficiency of the welding electrical power.

Conventional preheating methods use Joule, or resistive, preheating, inductive preheating, laser preheating, and/or infrared preheating. Direct Joule heating involves the conduction of current to a segment of the filler wire prior to the filler wire reaching the welding arc (or other application of the wire). Direct Joule heating can be performed by transferring current from work through the wire to a contact point and/or through a first contact point and through the wire to a second contact point. Direct Joule heating may involve using one or more additional cables to carry the preheating current, and the efficiency of direct Joule heating may depend on the electrical resistivity of the filler wire and the cable conductivity.

A method to improve Joule heating involves decreasing the wire diameter and/or increasing wire feed speed to maintain the high deposition rates. Increasing wire feed speed is practical only to the point where processes can be stopped or corrected on a human timescale. If the wire has insufficient heat to melt at the weld puddle, a bird nest of hot wire can form around the welding torch. If the wire has excess heat, the wire can "burn back," in which case sparking and arcing is created, and material is not deposited where desired and/or the welding torch may be damaged.

Electric arc wire heating is the application of an electrical arc to the welding wire. For example, one or more nonconsumable electrodes (e.g., tungsten or tungsten-alloy electrodes) may be used to create an arc between the nonconsumable electrode and the welding wire. The power delivered via the arc preheats the welding wire to a desired temperature. An advantage of electric arc wire heating over Joule heating is the current requirement reduction. The arc voltage drop appreciably decreases both the current requirement and the subsequent cable/connection losses attributed with high current applications. Since the heat generation is primarily from the arc, the electrical conductivity of the filler wire does not have a significant role in overall system efficiency. Electric arc wire heating therefore maintains similar performance for all metals and alloys. The arc is stable at small arc lengths and slow wire feed speeds. The present disclosure relates to apparatus, systems, and methods of using electrical arc(s) to preheat welding wire.

Additionally, the disclosed preheating system achieves a greater deposition rate as compared to cold wire welding, or conventional preheating systems. For example, TIG welding using the disclosed electric arc preheating system can achieve deposition rates of 200 inches per minute using 0.063" diameter wire. Currently, cold wire TIG welding achieves a deposition rate of 12 inches per minute using a 0.063" diameter wire.

An additional advantage of the present disclosure is that electrical arc(s) can be used to remove the oxide layer of aluminum welding wire. Aluminum is highly reactive, and forms a surface oxide layer when exposed to atmospheric conditions. The oxide layer contains significant amounts of water from atmospheric humidity. The water provides a source of hydrogen, which can cause porosity in an aluminum weld. Therefore, it is advantageous to remove the oxide layer, and to reduce or prevent the re-formation of the oxide layer after cleaning. Accordingly, disclosed systems and methods may be configured to remove the oxide layer of aluminum welding (as well as any other surface contaminant) via electric arc preheating of the wire. Shielding gas is provided to prevent the re-formation of the oxide layer on the aluminum welding wire.

Additionally, disclosed example systems and methods remove organic contaminants (e.g., hydrocarbons) from welding wire during the preheating process. Removing organic contaminants prevents weld defects caused by "dirty" welding wire, which can include porosity in the weld.

Additionally, disclosed preheating systems and methods can be retrofit into existing welding guns/torches. Existing welding torches may be modified to include one or more tungsten electrodes configured to preheat welding wire via arc preheating.

Preheating systems that use multiple electrodes connected to a polyphase power source (e.g., three electrodes are connected to the three phases of a three-phase power source), provide additional advantages. For example, in disclosed example three-phase preheating systems, when three-phase power is applied to the preheating electrodes, at least two electric arcs will exist at all times to preheat the welding wire. The existing electric arcs also facilitate reignition of commutating arcs. Further, since polyphase systems utilize alternating current, when polyphase systems are utilized, at any given time at least one arc is electrode positive, which facilitates removal of contaminants from aluminum welding wire.

Disclosed example apparatus for preheating welding wire include: an input configured to receive multi-phase power; a first tungsten electrode connected via a first conductor to the input, where the first conductor is configured to conduct a first phase of the multi-phase power received at the input; a second tungsten electrode connected via a second conductor to the input, where the second conductor is configured to conduct a second phase of the multi-phase power received at the input; and a third tungsten electrode connected via a third conductor to the input, and the third conductor is configured to conduct a third phase of the multi-phase power received at the input.

In some disclosed apparatus for preheating welding wire, the apparatus is configured to preheat welding wire via electric arc preheating.

Some disclosed apparatus for preheating welding wire further include a first region including shielding gas, and the electric arc preheating occurs within the first region.

Some disclosed apparatus for preheating welding wire further include a wire guide configured to deliver preheated welding wire from the first region to a workpiece; and a gas connecter configured to deliver shielding gas to the first region around the preheated welding wire delivered to the workpiece.

In some disclosed apparatus for preheating welding wire, the multi-phase power is three-phase power.

In some disclosed apparatus for preheating welding wire, the first tungsten electrode is offset from the second tungsten electrode around a circumference of the welding wire being preheated by 120 degrees, and the third tungsten electrode is offset circumferentially from the second tungsten electrode around a circumference of the welding wire by 120 degrees, and welding wire is fed generally between the first tungsten electrode, the second tungsten electrode, and the third tungsten electrode.

In some disclosed apparatus for preheating welding wire, the first tungsten electrode is offset along a length of the welding wire from the second tungsten electrode, the first tungsten electrode is offset along a length of the wire from the third tungsten electrode, and the second tungsten electrode is offset along a length of the wire from the third tungsten electrode.

In some disclosed apparatus for preheating welding wire, during a period when three-phase power is applied to the input, at least two electric arcs exist between a welding wire and at least two of the first tungsten electrode, the second tungsten electrode, or the third tungsten electrode.

In some disclosed apparatus for preheating welding wire, the first tungsten electrode, the second tungsten electrode, and the third tungsten electrode are approximately evenly spaced around a circumference of the welding wire being preheated.

Some disclosed apparatus for preheating welding wire further include a neutral conductor electrically connected to the welding wire and configured to connect via the input to a neutral line of the multi-phase power.

In some disclosed apparatus for preheating welding wire, the apparatus is a gas metal arc welding (GMAW) torch.

Some disclosed apparatus for preheating welding wire further include a contact tip electrically connected to the welding wire and a welding power source.

In some disclosed apparatus for preheating welding wire, the multi-phase power provides a regulated current.

In some disclosed apparatus for preheating welding wire, the multi-phase power operates between and 50 and 20000 hertz.

Disclosed example systems for preheating welding wire include: a multi-phase power source; a first tungsten electrode electrically connected to a first phase of the three-phase power source; a second tungsten electrode electrically connected a second phase of the three-phase power source; and a third tungsten electrode electrically connected a third phase of the three-phase power source.

In some disclosed systems for preheating welding wire, the system is configured to preheat welding wire via electric arc preheating.

Some disclosed systems for preheating welding wire further include a first region including shielding gas, and the electric arc preheating occurs within the first region.

Some disclosed systems for preheating welding wire further include: a wire guide configured to deliver preheated welding wire from the first region to a workpiece; and a gas connecter configured to deliver shielding gas to the first region around the preheated welding wire delivered to the workpiece.

In some disclosed systems for preheating welding wire, the multi-phase power is three-phase power.

In some disclosed systems for preheating welding wire, the first tungsten electrode is offset from the second tungsten electrode around a circumference of the welding wire being preheated by 120 degrees, and the third tungsten electrode is offset circumferentially from the second tungsten electrode around a circumference of the welding wire by 120 degrees, and welding wire is fed generally between the first tungsten electrode, the second tungsten electrode, and the third tungsten electrode.

FIG. 1a illustrates an exemplary welding-type system 10 including a welding power source 100. A source of power is provided to the welding power source 100 via an AC power cord 102. Typical ranges of AC power may be 115/230 VAC or 208-575 VAC, and may include single-phase or three-phase power. The welding power source 100 generally supplies power for the welding-type system 10. Weld output 104 provides welding output power via one or more weld cables 106 coupled to a modified welding torch 108 and a workpiece 110 using a clamp 112. Welding output power may be in the range of 10 Amps to 600 Amps or more, and range from 0 volts at short circuit to 44 volts or more into an open welding arc. Modern welding power sources and systems can provide welding-type power for various weld processes, which may include advanced waveform generation and control that is responsive to dynamic or static conditions at the welding arc.

The illustrated welding-type system 10 includes a wire feeder 114 and a gas supply 116. The welding power source 100 may provide power and control to other equipment such as a wire feeder 114. In the illustrated example, the modified welding torch 108 is coupled to the wire feeder 114 via cable 118 in order to supply welding wire, shielding gas from the gas supply 116, and/or welding-type power to the welding torch 108 during operation of the welding-type system 10. In some examples, the welding power source 100 may couple and/or directly supply welding-type power to the welding torch 108.

As described in more detail below, the welding torch 108 is configured to preheat welding wire via polyphase electric arc preheating. The welding torch 108 contains three or more tungsten electrodes, which preheat the fed welding wire via arc wire heating. In the welding-type system 100, the three or more tungsten electrodes are connected to the welding power supply 100 to provide preheating power, and/or to a separate source of preheating power. Accordingly, the preheating power source (which may be the welding power supply 100) is configured to provide multi-phase power. For example, in a three-phase system, the three electrodes are connected to three conductors which are connected to the three output phases of the preheating power source. In some examples, the welding power source 100 may output welding-type power and also output three-phase heating power to the torch 108 As explained in more detail below, in some examples, the three or more tungsten electrodes in the welding torch 108 may be connected to a dedicated polyphase preheating power source.

The example welding-type system 10 of FIG. 1 has been described as a GMAW system, but the preheating system as disclosed can also be used, for example, to preheat Gas Tungsten Arc Welding ("GTAW") filler wire. For example, the modified welding torch 108 may provide preheated welding filler wire for GTAW processes, flux-cored welding processes, metal-cored welding processes, submerged arc welding (SAW) processes, tandem welding processes, laser welding processes, hybrid welding processes, pulsed welding process, spray welding processes and/or any other processes involving adding wire filler metals. The preheating system may also be used to preheat wire electrode for deposition into a weld puddle in addition to conventional GMAW arc and electrode deposition, as a leading or trailing wire electrode deposition system. In some examples, a die may be provided to curl preheated welding wire from the welding torch into a weld pool on the workpiece.

Figure 1B:
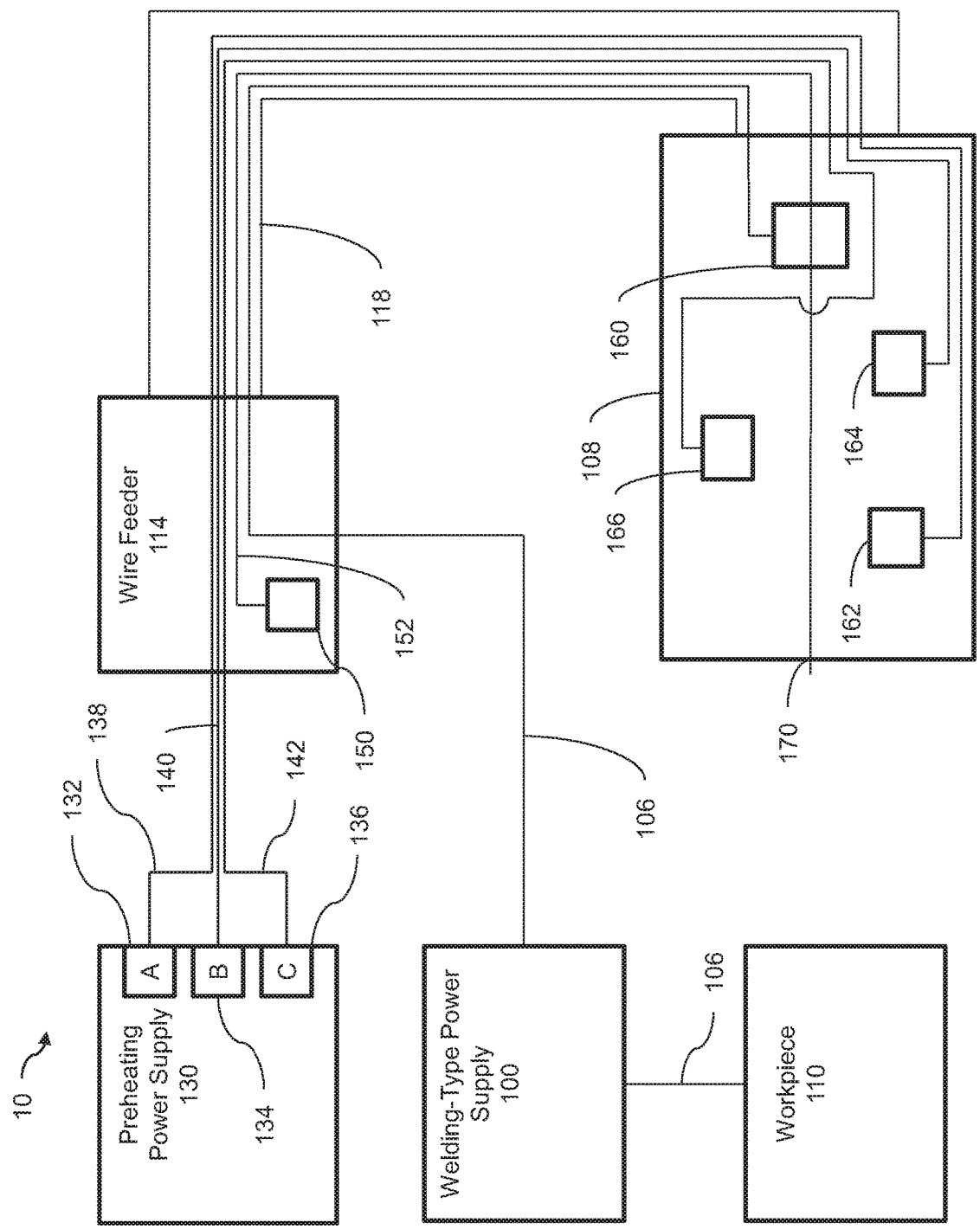
FIG. 1b is a block diagram of an example welding-type system in accordance with aspects of this disclosure.

FIG. 1b is a block diagram of the example welding system 10 of FIG. 1a in which the system 10 includes a polyphase preheating power supply 130. As illustrated, the preheating power supply 130 is a three-phase power source which has three alternating current ("AC") outputs, output A 132, output B 134, and output C 136. Output A 132 is 120 degrees out of phase with output B 134 and output C 136, and output B 134 is 120 degrees of phase with output C 136. In some examples, the three-phase power supply 130 is a regulated current power supply (e.g., the three-phase power supply 130 may be controlled to supply a consistent root mean square ("RMS") current). In some examples, the AC outputs (132, 134, 136) operate at an RMS current between 1 and 100 Amps. In some examples, the RMS current may be less than 1 Amp. In some examples, the frequency of the AC outputs (132, 134, 136) is between 50 Hz and 20 kHz. High operating frequencies may be used to facilitate arc ignition and reignition and allows for lower operating currents. The preheating power supply 130 may be any power supply that is configured to provide a polyphase AC output at the desired frequency and current levels.

Phase A 132 is connected via a conductor 138 to a first tungsten electrode 162 in the torch 108. Phase B 134 is connected via a conductor 140 to a second tungsten electrode 164 in the torch, and phase C 136 is connected via a conductor 142 to a third tungsten electrode 166 in the torch. The conductors 138, 140, and 142 connect to the torch 108 via the wire feeder 114. In some examples, between the wire feeder 114 and the torch 108, the conductors 138, 140, and 142, are included within the coupler 118, which also includes welding wire 152 fed by the wire feeder 114 from a welding wire source 150 as well as a power cable 106. Welding-type power provided by a welding-type power supply 100 is applied to the welding wire at the torch 108 via a contact tip 160. During a welding operation, welding-type current arcs between the torch 108 and the workpiece 110, and the current returns from the workpiece 110 to the welding-type power supply 100 via a conductor 106. In some examples, the contact tip 160 is closer to the torch tip 170 that the tungsten electrodes (162, 164, 166). In some examples, the tungsten electrodes (162, 164, 166) are closer to the torch tip 170 that the contact tip 160.

The three conductors 138, 140, and 142 connected to the three tungsten electrodes 162, 164, and 166 respectively, provide preheating power to the three tungsten electrodes 162, 164, and 166. During operation, at least two electric arcs exist between the three electrodes at any time. The three electrodes 162, 164, and 166 are physically arranged such that the electric arcs jump from an electrode (one of 162, 164, or 166) to the welding wire 152 and then to another electrode (one of 162, 164, or 166). For example, the tungsten electrodes 162, 164, and 166 may be offset circumferentially by 120 degrees from each other and spaced along the length of the welding wire 152. In some examples a neutral line (not shown) is connected to the welding wire 152 (for example via the contact tip 160) and the preheating power supply 130 via a fourth conductor (not shown). In some examples, a neutral conductor connects a fourth tungsten electrode to the preheating power supply 130. The preheating power supply 130 and the electrodes 162, 164, 166 may be configured in a delta configuration (e.g., without a neutral conductor) or in a Y configuration (e.g., using a neutral conductor).

Figure 2A:
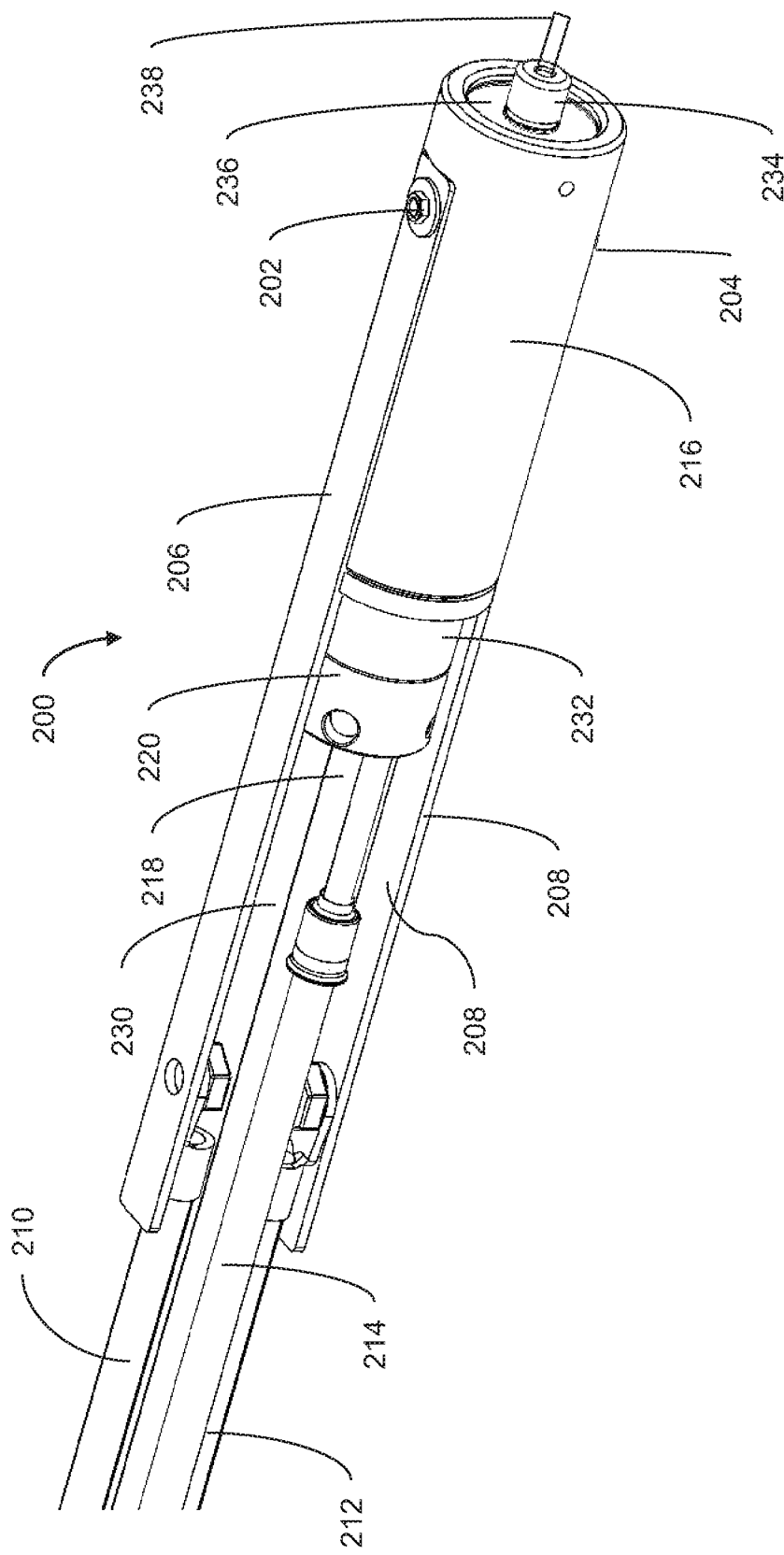
FIG. 2a is an illustration of an isometric view of a welding torch configured to preheat welding wire via electric arc preheating.
Figure 2B:
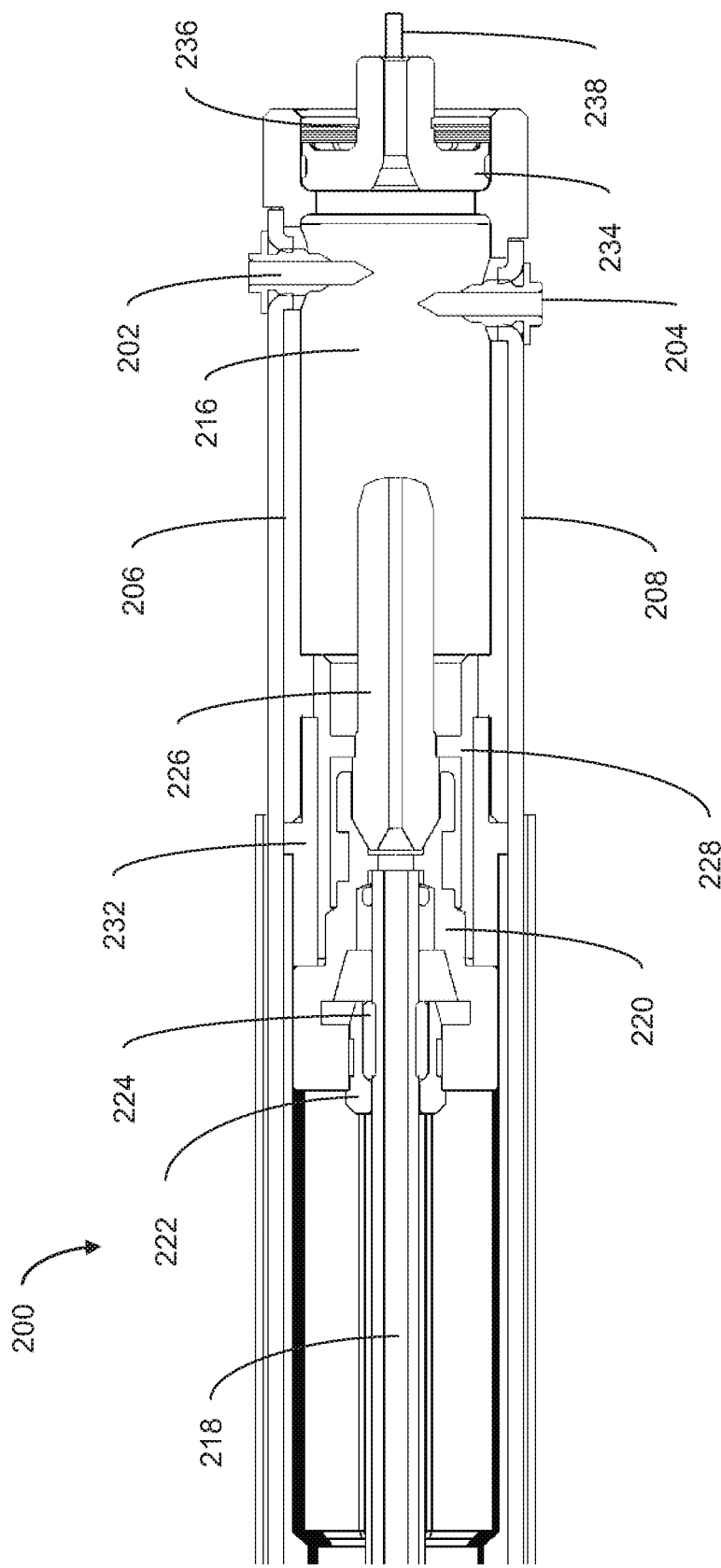
FIG. 2b is an illustration of a cross-sectional view of the welding torch of FIG. 2a, configured to preheat welding wire via electric arc preheating.

FIG. 2a shows an illustration of an isometric view of an example metal inert gas ("MIG") welding torch 200 configured to preheat welding wire. The welding torch 200 may implement the torch 108 of FIG. 1b. FIG. 2b shows a cross sectional view of the MIG welding torch 200. The handle of the MIG welding torch 200 is not shown in FIGS. 2a and 2b. The welding torch 200 includes a first tungsten electrode 202, a second tungsten electrode 204, and a third tungsten electrode 205 (which is not shown for ease of visibility). The first tungsten electrode 202 is connected to a first electric bus 206, and the second tungsten electrode 204 is connected to a second electric bus 208 (and the third tungsten electrode 205 is also connected to a third electric bus). The first electric bus 206 is connected to a power source (e.g., the power supply 130 of FIG. 1b) via a first power cable 210, and the second electric bus is connected to a power source (e.g., the power supply 130 of FIG. 1b) via a second power cable 212 (and the third electric bus is also connected to the power source). The welding torch 200 is supplied with shielding gas via shielding gas hose 214.

The first tungsten electrode 202, the second tungsten electrode 204, and the third tungsten electrode 205 (which may implement the electrodes 162, 164, 166) terminate in a chamber 216. The example chamber 216 is a ceramic tube, but may be another type of chamber configured to contain shielding gas adjacent the electrode wire traveling through the welding torch 200. The chamber 216 is supplied with shielding gas via the shielding gas hose 214. Welding wire is fed to the welding torch 200 via a wire liner 218. The wire liner 218 is connected to a connection block 220 via wire liner holder 222 and threaded wire liner holder 224. Fed welding wire enters a contact tip 226 from the wire liner 218, and then enters the chamber 216 via the contact tip 226. The contact tip 226 is connected to the connection block 220 via contact tip holder 228. The connection block 220 is connected to the preheating power source (e.g., the power supply 130 of FIG. 1b) via a third power cable 230, which provides a neutral line for the preheating circuit.

An insulator 232 insulates the connection block 220 from the first electric bus 206, the second electric bus 208, and the third electric bus. Preheated welding wire 238 exits the chamber 216 via a wire guide 234. Gas diffuser screens 236 diffuse shielding gas around the preheated welding wire 238 (e.g., the welding wire 152 of FIG. 1b) that exits the chamber 216 via the wire guide 234. In some examples, gas diffuser screen 236 diffuses shielding gas received from the chamber 216. In some examples, gas diffuser screen is connected to a gas supply, for example gas supply 116 of FIG. 1a, via a dedicated shielding gas hose (not shown). The welding wire 152 is preheated inside the chamber 216 via electric arc preheating via arcs generated between the tungsten electrodes and the welding wire. Each tungsten electrode 202, 204 and 205 is connected to a separate phase of a polyphase (e.g., three-phase) preheating power source.

Although FIGS. 2a and 2b illustrate a chamber 216, the electric arc preheating may occur in any region supplied with shielding gas, for example via a nozzle or gas diffuser.

As described in more detail below, in some examples preheating arcs may be between each tungsten electrode 202, 204, 205 and the welding wire. In some examples, the welding wire is connected to a neutral line of the polyphase preheating power source. For example, the contact tip 226 may be electrically coupled to a different terminal of the preheating power supply such that the tungsten electrode(s) 202, 204, 205, the arc(s), the welding wire, the contact tip 226, and the preheating power supply 130 form a preheating circuit (using appropriate electrical leads between the contact tip 226 and the preheating power supply 130 and between the tungsten electrode(s) 202, 204, 205 and the preheating power supply). FIG. 3 illustrates an example preheating circuit, which may or may not include the contact tip 226. In some examples, a separate neutral line is not used. The contact tip 226 may be connected to the preheating power source 130 as the neutral line and/or the electrodes 202, 204, 205 may be connected in a delta configuration without a neutral line.

The distance between the tungsten electrodes (202, 204, and 205) and the welding wire is approximately 0.5 millimeters. In some examples, the positions of the tungsten electrodes 202, 204, and 205 are adjustable. In some examples, the arc gap is adjustable. In some examples, the distance between the tungsten electrodes 202, 204, and 205 and the welding wire is adjustable to accommodate different sizes of welding wire and/or to adjustments of the preheating arc voltage.

Because the tungsten electrodes are connected to an AC polyphase power supply (e.g., a three-phase power supply), during operation, at least one arc is electrode positive at all times. Electrode positive polarity arc (e.g., when the tungsten electrode (202, 204, or 205) has a positive voltage relative to the electrode wire) more readily remove oxidation layers on aluminum welding wire compared to electrode negative polarity. Preheating aluminum welding wire with an electrode positive arc therefore removes the oxidation layer from the aluminum welding wire. The tungsten electrodes 202, 204 and 205 may be offset evenly circumferentially (e.g., each by 120 degrees from each other) in order to remove the oxide layer from all sides of the welding wire, as well as to evenly preheat the welding wire. In some examples, the tungsten electrodes 202, 204 and 205 may be evenly spaced around the circumference of the welding wire (e.g., each by 120 degrees from each other, plus or minus 30 degrees).

The example chamber 216 is filled with shielding gas to prevent the re-oxidation of cleaned aluminum welding wire. In some examples, the welding wire 238 may not be preheated inside of a chamber 216 (e.g., the preheating may be temporarily turned off or disabled). In some such examples, a nozzle may provide shielding gas to the preheated and cleaned aluminum welding wire to prevent the re-oxidation of the aluminum welding wire. Additionally or alternatively, the chamber 216 may include a nozzle portion (e.g., a taper at an end of the chamber 216 closest to the welding arc) to focus shielding gas flow toward the weld puddle.

FIG. 3a is a block diagram of an exemplary electric arc preheating system 300, embodied, for example, in the welding torch 108 of FIG. 1b and 200 of FIGS. 2a and 2b. The preheating system 300 includes a first tungsten electrode 302 a second tungsten electrode 304, and a third tungsten electrode 306. The electrodes 302, 305, and 306 may implement the electrodes 162, 164, and 166 of FIG. 1b. The first tungsten electrode 302 is electrically connected to a first phase of the preheating power source 308, the second tungsten electrode 304 is electrically connected a second phase of the preheating power source 308, and the third tungsten electrode is electrically connected to a third phase of the preheating power source 308. The first, second, and third phases of the preheating power source 308 are 120 degrees out of phase with respect to each other.

Welding wire 310 is fed through a contact tip 312 and delivered to a workpiece 314 via a wire guide 316. The contact tip 312 is electrically connected to a neutral line of the preheating power source 308. The contact tip is also electrically connected to a welding-type power source (not shown) in order to apply welding-type current to the welding wire 310.

Welding wire 310 is preheated by electric arcs between the tungsten electrodes 302, 304, and 306 and the welding wire 310. At any given time, at least two arcs will exist between the electrodes 302, 304, and 306, and the wire 310. FIG. 3a shows the three arcs 322, 324, and 326, of which at least two will exist at any given time. The electric arcs 322, 324, and 326 jump from an electrode (302, 304, 306) to the welding wire 310 and then to another electrode (302, 304, 306). The two arcs (two of arcs 322, 324, and 326) that exist at any given time are in series, and therefore the total voltage drop across the arcs is equal to the sum of the voltage across each arc. Thus using a three-phase system decreases the arc current by half while maintaining the same power level as compared to a preheating system which uses a single arc (e.g., between a single tungsten electrode and the wire 310).

As illustrated, the tungsten electrodes 302, 304, and 306 are positioned between the contact tip 312 and the wire guide 316. In some examples, the contact tip 312 may be closer to the wire guide 316 than the tungsten electrodes 302, 304, and 306. As explained with reference to FIGS. 2a and 2b, the electric arcs 322, 324, and 326 may occur inside of a chamber filled with shielding gas in order to prevent re-oxidation of the welding wire 310.

Figure 3B:
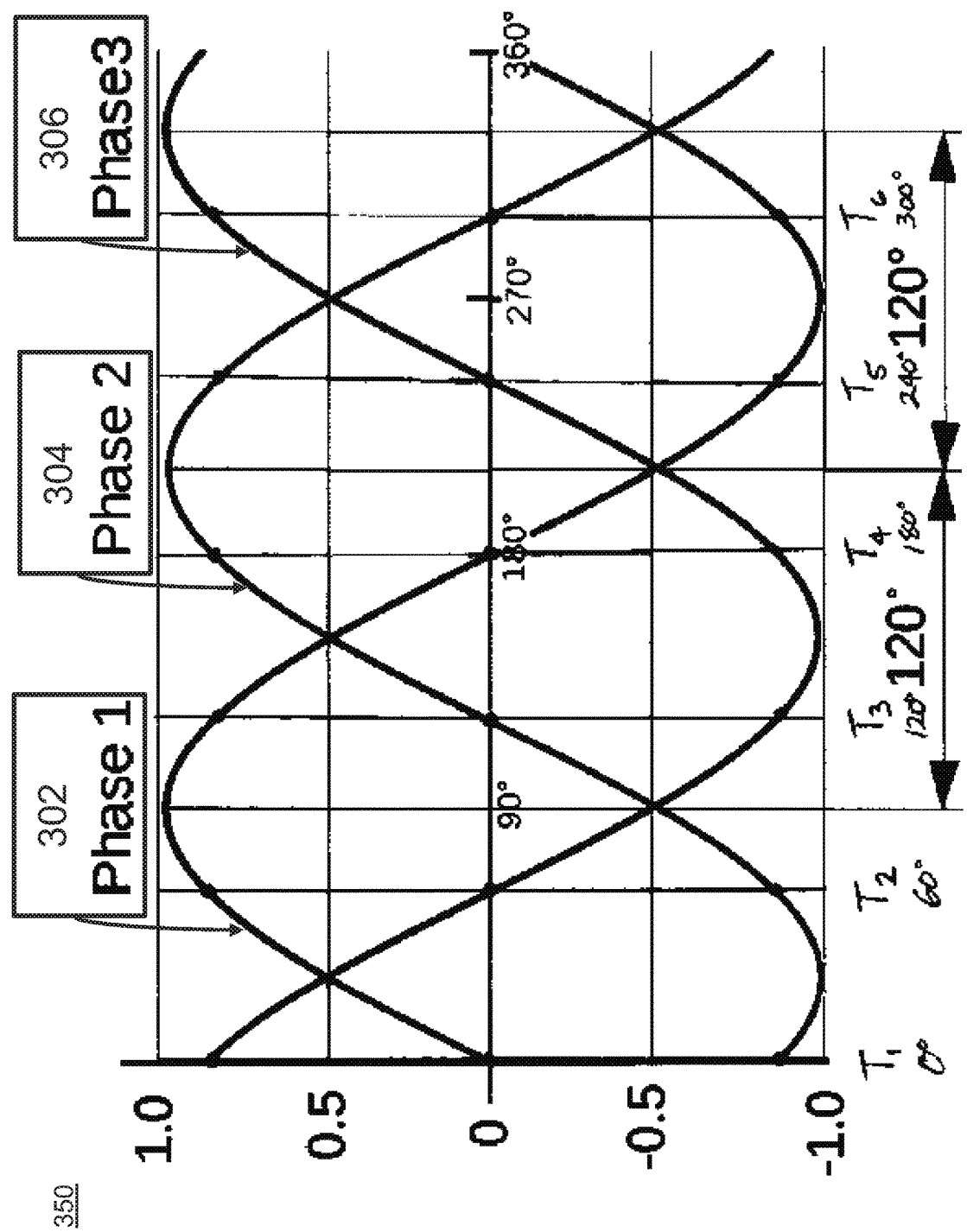

FIG. 3b is an example scaled time plot 350 of the voltage at each electrode 302, 304, and 306 in a given cycle of the three phase power for. In the example, phase 1 is applied the first electrode 302, phase 2 is applied to the second electrode 304, and phase 3 is applied to the third electrode 306. At time T1, phase 1 connected to the first electrode 302 is commutating, a first arc 326 exists from the third electrode 306 to the wire 310, and a second arc 324 exists from the wire 310 to the second electrode 304.

Time T2 corresponds to the time when the phases of phase 1, phase 2, and phase 3, are 60 degrees in the periodic cycle. At time T2, phase 3 connected to the third electrode 306 is commutating, a first arc 322 exists from the first electrode 302 to the wire 310, and a second arc 324 exists from the wire 310 to the second electrode 304.

Time T3 corresponds to the time when the phases of phase 1, phase 2, and phase 3, are 120 degrees in the periodic cycle. At time T2, phase 2 connected to the second electrode 304 is commutating, a first arc 322 exists from the first electrode 302 to the wire 310, and a second arc 326 exists from the wire 310 to the third electrode 306.

Time T4 corresponds to the time when the phases of phase 1, phase 2, and phase 3, are 180 degrees in the periodic cycle. At time T4, phase 1 connected to the first electrode 302 is commutating, a first arc 324 exists from the second electrode 304 to the wire 310, and a second arc 326 exists from the wire 310 to the third electrode 306.

Time T5 corresponds to the time when the phases of phase 1, phase 2, and phase 3, are 240 degrees in the periodic cycle. At time T5, phase 3 connected to the third electrode 306 is commutating, a first arc 324 exists from the second electrode 304 to the wire 310, and a second arc 322 exists from the wire 310 to the first electrode 302.

Time T6 corresponds to the time when the phases of phase 1, phase 2, and phase 3, are 300 degrees in the periodic cycle. At time T6, phase 2 connected to the second electrode 304 is commutating, a first arc 326 exists from the third electrode 306 to the wire 310, and a second arc 322 exists from the wire 310 to the first electrode 302.

As will be understood with reference to FIG. 3b, in the system 300, when three-phase power is applied to the electrodes 302, 304, and 306, the power delivered to the wire 310 is the same (i.e., is uniform) across all time intervals.

FIGS. 4a, 4b, 5a, and 5b illustrate views of example positioning of the preheating tungsten electrode(s) of the present disclosure.

Figure 4B:
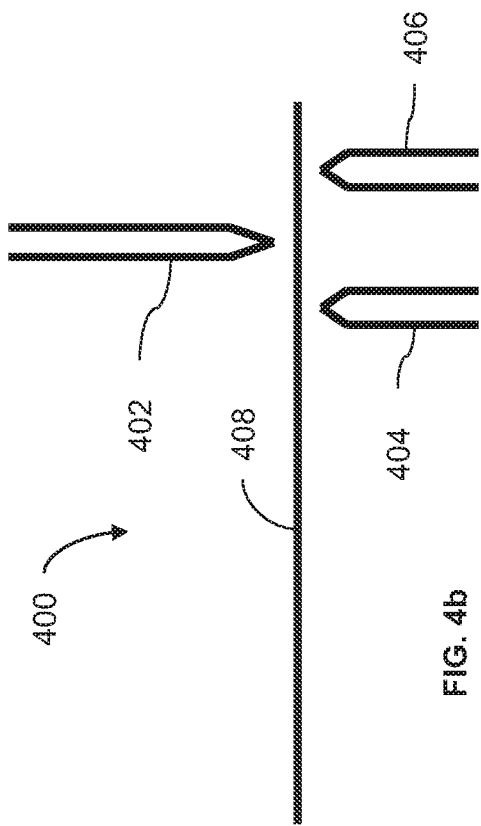
FIG. 4b is a side view of the example electric arc preheating system of FIG. 4a including three tungsten electrodes.
Figure 4A:
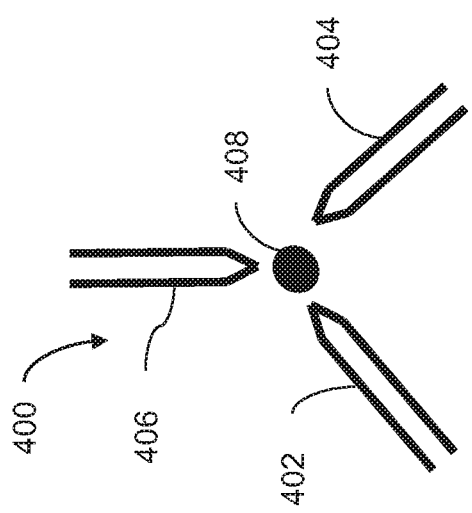
FIG. 4a is an illustration of an example arrangement of an electric arc preheating system using three tungsten electrodes.

FIG. 4a shows a front view of a preheating system 400 using three preheating tungsten electrodes where each electrode is connected to a separate phase of a three-phase power supply. A first tungsten electrode 402, a second tungsten electrode 404, and a third tungsten electrode 406 are configured to preheat a welding wire 408. The first tungsten electrode 402, the second tungsten electrode 404, and the third tungsten electrode 406 are offset circumferentially (i.e. by 120 degrees) so as to evenly preheat the welding wire 408, as well as to evenly clean an aluminum welding wire 408. Preheating arcs occur between the three tungsten electrodes 402, 404, and 406, and the welding wire 408. An arc jumps from an electrode (402, 404, or 406) to the welding wire 408 and then to another electrode (402, 404, or 406).

FIG. 4b shows that the tungsten electrodes 402, 404, and 406 are offset along the length of the welding wire 408. The tungsten electrodes 402, 404, and 406 are offset to ensure that the arcs jump from the electrodes (402, 404, or 406) to the welding wire 408 and then to another electrode (402, 404, or 406), rather than directly from electrode to electrode.

Figure 5A:
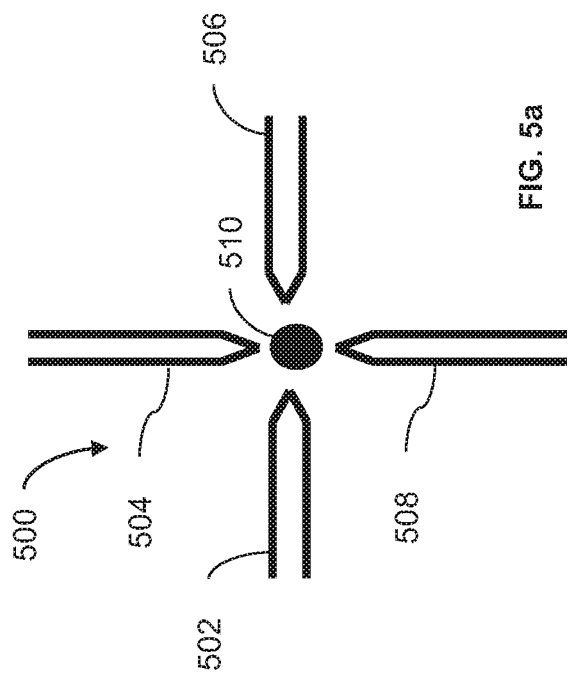
FIG. 5a is an illustration of an example arrangement of an electric arc preheating system using four tungsten electrodes.

FIG. 5a shows a front view of a preheating system 500 using four preheating tungsten electrodes where each electrode is connected to a separate phase of a four-phase power supply. A first tungsten electrode 502, a second tungsten electrode 504, a third tungsten electrode 506, and a fourth tungsten electrode 508 are configured to preheat a welding wire 510. The first tungsten electrode 502, the second tungsten electrode 504, the third tungsten electrode 506, and the fourth tungsten electrode 508 are offset circumferentially (i.e. by 90 degrees) so as to evenly preheat the welding wire 510, as well as to evenly clean an aluminum welding wire 510. Preheating arcs occur between the three tungsten electrodes 502, 504, 506, and 508, and the welding wire 510. An arc jumps from an electrode (502, 504, 506, or 508) to the welding wire 510 and then to another electrode (502, 504, 506, or 508).

Figure 5B:
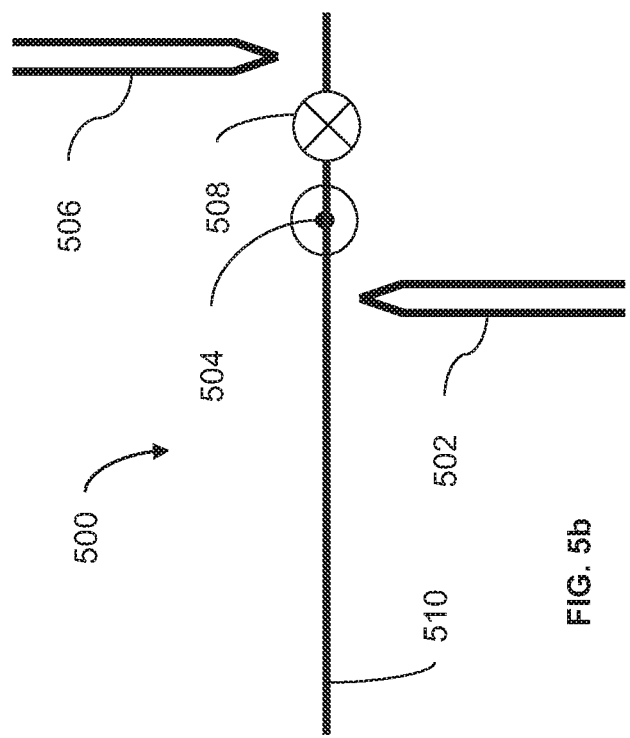
FIG. 5b is a side view of the example electric arc preheating system of FIG. 5a including four tungsten electrodes.

FIG. 5b shows that the tungsten electrodes 502, 504, 506, and 508 are offset along the length of the welding wire 510. The tungsten electrodes 502, 504, 506, and 508 are offset to ensure that the arcs jump from the electrodes (502, 504, 506, or 508) to the welding wire 510 and then to another electrode (502, 504, 506, or 508), rather than directly from electrode to electrode.

Welding-type power supply and welding power source, as used herein, refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Welding-type system, as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

Welding operation, as used herein, includes both actual welds (e.g., resulting in joining, such as welding or brazing) of two or more physical objects, an overlaying, texturing, and/or heat-treating of a physical object, and/or a cut of a physical object) and simulated or virtual welds (e.g., a visualization of a weld without a physical weld occurring).

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy. Electric power of the kind measured in watts as the product of voltage and current (e.g., V*I power) is referred to herein as "wattage."

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. An apparatus for preheating welding wire, the apparatus comprising:
    a contact tip configured to deliver welding current to a welding wire;
    a wire guide configured to deliver preheated welding wire from a first region to a workpiece;
    a chamber between the contact tip and the wire guide;
    an input configured to receive multi-phase power;
    a first tungsten electrode connected via a first conductor to the input, wherein the first conductor is configured to conduct a first phase of the multi-phase power received at the input to produce a first electric arc within the chamber between the first tungsten electrode and the welding wire in accordance with the first phase of the multi-phase power;
    a second tungsten electrode connected via a second conductor to the input, wherein the second conductor is configured to conduct a second phase of the multi-phase power received at the input to produce a second electric arc within the chamber between the second tungsten electrode and the welding wire in accordance with the second phase of the multi-phase power; and
    a third tungsten electrode connected via a third conductor to the input, wherein the third conductor is configured to conduct a third phase of the multi-phase power received at the input to produce a third electric arc within the chamber between the third tungsten electrode and the welding wire in accordance with the third phase of the multi-phase power.

2. The apparatus of claim 1, wherein the apparatus is configured to preheat the welding wire at a location adjacent the first, second, and third tungsten electrodes via electric arc preheating.

3. The apparatus of claim 2, wherein the first region comprises shielding gas and is located adjacent the first, second, and third tungsten electrodes, wherein the electric arc preheating occurs within the first region.

4. The apparatus of claim 3, further comprising:
    a gas connecter configured to deliver shielding gas to the chamber around the preheated welding wire delivered to the workpiece.

5. The apparatus of claim 2, wherein the multi-phase power is three-phase power.

6. The apparatus of claim 5, wherein the first tungsten electrode is offset from the second tungsten electrode around a circumference of the welding wire being preheated by 120 degrees, and the third tungsten electrode is offset circumferentially from the second tungsten electrode around a circumference of the welding wire by 120 degrees, and wherein welding wire is fed generally between the first tungsten electrode, the second tungsten electrode, and the third tungsten electrode.

7. The apparatus of claim 6, wherein the first tungsten electrode is offset along a length of the welding wire from the second tungsten electrode, the first tungsten electrode is offset along a length of the wire from the third tungsten electrode, and the second tungsten electrode is offset along a length of the wire from the third tungsten electrode.

8. The apparatus of claim 5, wherein during a period when three-phase power is applied to the input, at least two electric arcs exist between a welding wire and at least two of the first tungsten electrode, the second tungsten electrode, or the third tungsten electrode.

9. The apparatus of claim 2, wherein the first tungsten electrode, the second tungsten electrode, and the third tungsten electrode are approximately evenly spaced around a circumference of the welding wire being preheated.

10. The apparatus of claim 2, further comprising a neutral conductor electrically connected to the welding wire and configured to connect via the input to a neutral line of the multi-phase power.

11. The apparatus of claim 1, wherein the apparatus is a gas metal arc welding (GMAW) torch.

12. The apparatus of claim 1, wherein the multi-phase power provides a regulated current.

13. The apparatus of claim 1, wherein the multi-phase power operates between and 50 and 20000 hertz.

14. A system for preheating welding wire, the system comprising:
- a first contact tip configured to deliver welding current to a welding wire;
- a wire guide configured to deliver preheated welding wire from a first region to a workpiece;
- a chamber between the contact tip and the wire guide;
- a multi-phase power source;
- a first tungsten electrode electrically connected to a first phase of the multi-phase power source;
- a second tungsten electrode electrically connected to a second phase of the multi-phase power source;
- a third tungsten electrode electrically connected to a third phase of the multi-phase power source; and
- a second contact tip coupled to the multi-phase power source, the first tungsten electrode, the second tungsten electrode, the third tungsten electrode, and the second contact tip configured to supply current to form electric arcs between the welding wire and the first tungsten electrode, the second tungsten electrode, and the third tungsten electrode in accordance with phases of the multi-phase power source.

15. The system of claim 14, wherein the system is configured to preheat the welding wire at a location adjacent the first, second, and third tungsten electrodes via electric arc preheating.

16. The system of claim 15, wherein the first region comprises shielding gas and is located adjacent the first, second, and third tungsten electrodes, wherein the electric arc preheating occurs within the first region.

17. The system of claim 16, further comprising:
- a gas connecter configured to deliver shielding gas to the first region around the preheated welding wire delivered to the workpiece.

18. The system of claim 15, wherein the multi-phase power is three-phase power.

19. The system of claim 18, wherein the first tungsten electrode is offset from the second tungsten electrode around a circumference of the welding wire being preheated by 120 degrees, and the third tungsten electrode is offset circumferentially from the second tungsten electrode around a circumference of the welding wire by 120 degrees, and wherein welding wire is fed generally between the first tungsten electrode, the second tungsten electrode, and the third tungsten electrode.

\* \* \* \* \*